United States Patent [19]
Mazdiyasni et al.

[11] 3,922,333
[45] Nov. 25, 1975

[54] PROCESS FOR PREPARING MULLITE POWDER AND FABRICATION OF STRUCTURAL BODIES THEREFROM

[75] Inventors: Khodabakhsh S. Mazdiyasni, Xenia; Leanne M. Brown, Brookville, both of Ohio

[73] Assignee: The United States of America as represented by the Secretary of the Air Force, Washington, D.C.

[22] Filed: Oct. 23, 1974

[21] Appl. No.: 517,339

Related U.S. Application Data

[63] Continuation-in-part of Ser. No. 366,887, June 4, 1973, abandoned.

[52] U.S. Cl. .................................. 423/327; 264/109
[51] Int. Cl.² ......................................... C01B 33/26
[58] Field of Search ......... 423/327, 328; 106/65, 69

[56] References Cited
UNITED STATES PATENTS
2,389,352  11/1945  Fisher ............................ 423/327 X
3,336,108  8/1967  Leatham ......................... 423/327 X Primary Examiner—Oscar R. Vertiz
Assistant Examiner—Michael L. Lewis
Attorney, Agent, or Firm—Joseph E. Rusz; Cedric H. Kuhn

[57] ABSTRACT

A process is provided for preparing high purity, submicron, mullite powder ($3Al_2O_3 \cdot 2SiO_2$) by hydrolytically decomposing aluminum tris isopropoxide and silicon tetrakis isopropoxide in the presence of ammonium hydroxide or a very dilute mineral acid. The powder as prepared as well as that subjected to calcination has an orthorhombic crystal structure. Structural bodies of near theoretical density can be fabricated by vacuum hot pressing the powder. Because of its large surface area, the mullite powder is an excellent catalyst and catalyst carrier, especially for hydrocarbon cracking catalysts.

12 Claims, No Drawings

PROCESS FOR PREPARING MULLITE POWDER AND FABRICATION OF STRUCTURAL BODIES THEREFROM

This application is a continuation-in-part of copending application Ser. No. 366,887, filed on June 4, 1973, and now abandoned.

RIGHTS OF THE GOVERNMENT

The invention described herein may be manufactured and used by or for the Government of the United States for all governmental purposes without the payment of any royalty.

FIELD OF THE INVENTION

This invention relates to a process for preparing high purity, submicron, stoichiometric aluminum silicate (mullite). In one aspect it relates to a process for fabricating structural bodies from mullite powder.

BACKGROUND OF THE INVENTION

In the past considerable work has been directed toward the synthesis of polycrystalline stoichiometric mullite having the composition $3Al_2O_3 \cdot 2SiO_2$. In the usual method of synthesis, various alumina-silica ores, e.g., a mixture of kaolinite and gibbsite or mixtures of silicon containing compounds with gibbsite, are calcined at elevated temperatures. The coprecipitation of aluminum and silicon salts is a convenient method for preparing an amorphous, highly reactive material. Thermal decomposition of methylsiloxyaluminum compounds has also been employed in preparing mullite.

As pointed out by Davis and Pask in High Temperature Oxides, Part IV, Academic Press, Inc., New York (1971), there are several limitations in extending the work on synthetic mullite so as to provide a superior refractory ceramic. The major problem is that, regardless of the starting $Al_2O_3$ to $SiO_2$ ratio (in the range of 3:2 to 2:1), sintering the powdered mixture in the absence of a liquid phase produces mullite of 3:2 composition with a chunky granular habit while rapid cooling from the liquid phase forms a 2:1 composition with a needle-like habit. The chunky sintered mullite does not have the freedom afforded the acicular-type habit from the liquid phase and thus cannot grow normally. The authors also concluded that the compositions produced up to the present time are non-stoichiometric mullite. Invariably the product contains excess silica or alumina as a second phase.

It is an object of this invention to provide a process for preparing stoichiometric aluminum silicate (mullite).

Another object of the invention is to provide a process for preparing a mullite powder which has an orthorhombic crystal structure and is submicron in size.

A further object of the invention is to provide a process for fabricating structural bodies from mullite powder that exhibit excellent strength and thermal shock resistance.

Other objects and advantages of the invention will become apparent to those skilled in the art upon consideration of the accompanying disclosure.

SUMMARY OF THE INVENTION

Broadly speaking, the present invention resides in a process for preparing stoichiometric aluminum silicate (mullite) that comprises the step of hydrolytically decomposing in the presence of a dilute solution of a weak base or mineral acid a mixture of stoichiometric amounts of aluminum tris isopropoxide and a silicon alkoxide having the formula $Si(OR)_4$, where R is methyl, ethyl, isopropyl or n-butyl, the mixture being in solution in an alcohol having the formula ROH and the alcohol used having the same R group as the silicon alkoxide. The hydroxyaluminosilicate that is thereby formed is then washed with isopropyl alcohol and dried under a vacuum so as to convert it to stoichiometric aluminum silicate (mullite).

In a preferred embodiment, the aluminum tris isopropoxide is added to a stoichiometric amount of the above-defined silicon alkoxide. The mixed alkoxides are then added to methyl, ethyl, isopropyl or n-butyl alcohol, and the resulting solution is refluxed for from about 8 to 24 hours to ensure thorough mixing. The actual alcohol used depends upon the particular silicon alkoxide that is employed. Thus, the alcohol chosen is one having an alkyl group which corresponds to the R group of the silicon alkoxide. An excess of the alcohol, e.g., an excess of from 1 to 3 mols, over that required to dissolve the alkoxides is preferably employed. The resulting solution of alkoxides is then added to a dilute solution of a weak base or mineral acid. It is usually preferred to use high purity ammonium hydroxide as the weak base and high purity nitric acid as the mineral acid. In the case of the solution of a weak base, the concentration of the base in the solution can vary within broad limits, it only being necessary that the reaction be conducted in the presence of the base. Thus, it is within the scope of the invention to use a saturated solution, e.g., a solution of 25 weight percent ammonia in water at 23°C, as well as very dilute solutions. It is usually preferred to employ dilute solutions because in using solutions of high concentration ammonia merely boils off. Dilute solutions that have been found to be satisfactory are those containing from about 0.25 to 5 milliliters of saturated ammonium hydroxide solution per mol of water. As to the solution of mineral acid, a few drops, e.g., 2 to 5 drops, of the acid per mol of water is generally sufficient. Whether a weak base or a mineral acid solution is used depends upon the particular silicon alkoxide employed. Thus, a dilute solution of a weak base is utilized when the silicon alkoxide is silicon tetrakis methoxide or ethoxide. With silicon tetrakis isopropoxide either a weak base or mineral acid solution can be employed while a solution of a mineral acid is used with silicon tetrakis butoxide. In the reaction that occurs upon addition of the mixed-alkoxide solution, hydroxyaluminosilicate is formed. The following equation shows the reaction that occurs when a solution of a mixture of aluminum tris isopropoxide and tetrakis silicon isopropoxide in isopropanol is added to ammonium hydroxide.

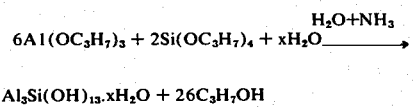

$6Al(OC_3H_7)_3 + 2Si(OC_3H_7)_4 + xH_2O \longrightarrow$ $2Al_3Si(OH)_{13} \cdot xH_2O + 26C_3H_7OH$ A similar reaction occurs when other silicon alkoxides are employed, it being understood that a mixture of alcohols will be obtained. For example, when silicon tetrakis ethoxide is used, a mixture of ethanol and isopropanol is obtained.

The hydroxyaluminosilicate in the form of a white precipitate is washed several times with dry isopropyl alcohol. After separation from the alcohol, the material is dried under a vacuum. The drying step is conducted at a temperature below the boiling point (82°C) of isopropyl alcohol, e.g., at a temperature ranging from about 55° to 65°C, and under a vacuum for a period of time sufficient to distill off any remaining alcohol and the water which is formed. Generally, heating the material under a vacuum of 0.5 to 2 mm of mercury for a period of from 12 to 24 hours is sufficient to evaporate the alcohol and water. As a result of the drying step, the hydroxyaluminosilicate is dehydrated to mullite ($3Al_2O_3 \cdot 2SiO_2$) as shown by the following equation:

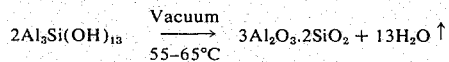

$$2Al_3Si(OH)_{13} \xrightarrow[55-65°C]{Vacuum} 3Al_2O_3 \cdot 2SiO_2 + 13H_2O \uparrow$$

The mullite powder recovered from the drying step is in the form of prismatic or needle-like particulates. The powder is then calcined, leading to acicular or prismatic particulates having an orthorhombic crystalline structure. The calcination is usually conducted at a temperature in the range of about 500° to 700°C for a period of about 1 to 24 hours. The powder can be calcined statically (without tumbling) or dynamically (with tumbling). The latter procedure is often preferred because uniform crystallite growth is ensured.

In another preferred embodiment, highly dense, translucent, polycrystalline bodies of stoichiometric aluminum silicate (mullite) are fabricated by vacuum hot pressing the high purity, submicron mullite powder. Thus, the mullite powder, which has been calcined as described above, is compressed under a vacuum in a mold for a period of about 15 to 60 minutes under a pressure of about 3 to 5 thousand pounds per square inch (Kpsi) and at a temperature of about 1300° to 1600°C. A vacuum ranging from about $5 \times 10^{-4}$ to $5 \times 10^{-3}$ mm of Hg is generally sufficient. A graphite mold lined with tantalum foil, molybdenum foil or graphfoil can be conveniently employed in carrying out the process.

As determined by X-ray diffraction and electron microprobe examination, the bodies or compacts contain only mullite in their structure. Microhardness values do not vary across the bodies, supporting the X-ray and microprobe evidence that a second phase is not present. The unique microstructural features of the structures prepared by vacuum hot pressing are interlocking needle-like, acicular, and polygonal grains arranged in an overall mosaic-type fine-grained microstructure. The microstructure of the compacts accounts for their high strength and excellent thermal shock resistance. Because of these outstanding properties, the compacts can be advantageously employed for structural applications such as radomes and blades or buckets in high performance turbine engines.

A more complete understanding of the invention can be obtained by referring to the following illustrative examples which are not intended, however, to be unduly limitative of the invention.

EXAMPLE I

A run was conducted in which mullite powder ($3Al_2O_3 \cdot 2SiO_2$) was prepared by the hydrolytic decomposition of aluminum tris isopropoxide and silicon tetrakis isopropoxide.

The aluminum tris isopropoxide was prepared by the reaction of aluminum metal foil of 99.99+% purity with excess isopropyl alcohol, using $10^{-4}$ mol of $HgCl_2$ per mol of aluminum as a catalyst. The reaction that occurred is shown by the following equation:

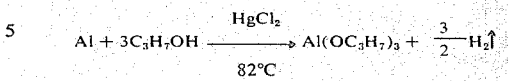

$$Al + 3C_3H_7OH \xrightarrow[82°C]{HgCl_2} Al(OC_3H_7)_3 + \frac{3}{2}H_2 \uparrow$$

The silicon tetrakis isopropoxide was prepared by reacting silicon tetrachloride and isopropyl alcohol as shown by the following equation:

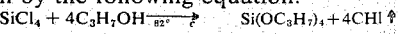

$$SiCl_4 + 4C_3H_7OH \xrightarrow{82°} Si(OC_3H_7)_4 + 4CHl \uparrow$$

Silicon tetrachloride of 99.95% purity was used. Prior to use in both preparations, analytical grade isopropyl alcohol was dried over $CaH_2$ and fractionally distilled at its boiling point.

Aluminum tris isopropoxide was added to a stoichiometric amount of silicon tetrakis isopropoxide. The mixed alkoxides were refluxed in excess isopropyl alcohol for 16 hours to ensure thorough mixing. The alkoxide solution was then added to 600 milliliters of triply distilled deionized water containing 25 milliliters of saturated ammonium hydroxide solution. The hydroxyaluminosilicate formed by the hydrolytic decomposition of the alkoxides was washed several times with dry isopropyl alcohol. After separation of the hydroxyaluminosilicate in the form of a white precipitate from the alcohol, it was dried under a vacuum at 60°C for 16 hours. A run was also carried out with similar results in which the alkoxide solution was added to a dilute nitric acid solution.

A quantative analysis of the powder indicated that it contained 71.8 weight percent $Al_2O_3$ and 28.2 weight percent $SiO_2$. These weight percentages correspond to the 3 to 2 ratio of $Al_2O_3$ to $SiO_2$ in mullite. The powder was amorphous to X-ray diffraction, but examination by electron microscopy showed needle-like crystallites of very fine particulates. The electron diffraction pattern indicated crystalline aluminum silicate or mullite.

Samples of the mullite powder, prepared as described above, were calcined in air at 600°C. One sample was calcined statically (without tumbling) for 1 hour, a second sample was calcined statically for 24 hours, and a third sample was calcined dynamically (with tumbling) for 24 hours.

The powder as prepared and the calcined samples of the powder were examined by electron microscopy. In carrying out this examination, in each case the powder was dispersed ultrasonically in a solution of absolute ethyl alcohol. A small amount of the dispersion was then placed in a Freon nebulizer and sprayed onto a carbon substrate on a copper mesh screen. The electron micrograph of the as-prepared powder showed needle-like crystallites of very fine particulates. The electron micrographs for the calcined powders showed that crystallite growth had occurred, leading to very large but well-defined acicular or prismatic particulates of orthorhombic structure. Also, the electron micrographs showed that the powders were submicron in size.

The BET surface area measurement of the as-prepared powder indicated a surface area of about 550 $m^2/g$. However, the powder calcined at 600°C for 1 hour had a surface area of about 280 $m^2/g$. This reduction in surface area is attributed to nucleation and growth of the finer particulates to larger networks of needle-like crystallites.

Spectrographic analysis for impurities in the mullite powder calcined at 600°C for 1 hour showed no measurable impurities present in two representative batches prepared as described above. Separate analyses for the oxides demonstrated the maintenance of high purity levels on a continuing basis. The results of the analyses are shown below in Table I.

TABLE I

| Element | Mullite I (ppm) | Mullite II (ppm) |
| --- | --- | --- |
| Cu | 20 | 20 |
| Pb | < 1 | 10 |
| Fe | 3 | 10 |
| B | 1 | 3 |
| Zr | < 5 | 5 |
| Ni | < 1 | 1 |
| Mg | 1 | 1 |
| Mn | < 1 | < 1 |
| V,Mo | < 3 | < 3 |
| Sn | < 5 | < 5 |
| Cr,Ti | < 10 | < 10 |
| Cd,Co,Zn | < 30 | < 30 |
| Na | <300 | <300 |

The high temperature X-ray diffraction pattern of the as-prepared powder was observed from room temperature to 1705°C on a Pt40Rh substrate using CuK$\alpha$ radiation. Temperatures were measured with a Pt-Pt10Rh thermocouple. Initially the powder was amorphous, with a very broad peak extending from 24° to 31° 2$\theta$. No significant changes were observed up to 345°C. As the temperature was increased at 200°C intervals between 435° and 1100°C, the aforementioned peak disappeared completely. However, at 1185° to 1200°C peaks corresponding to orthorhombic mullite, with the exception of a peak at 2$\theta$ = 16.4°, began to appear. From 1200° to 1700°C all peaks corresponding to mullite were observed and increased in intensity with temperature. This phase was retained during cooling to room temperature and recycling of the same sample, indicating complete solid solution of the $3Al_2O_3 \cdot 2SiO_2$ under these experimental conditions.

As seen from the foregoing, the present invention provides a process for preparing mullite powder having a submicron particle size and a purity of 99.999+%. Furthermore, the powder produced has a surface area ranging from about 280 to 550 square meters per gram. In the mullite prepared in accordance with the present invention, the needle-like morphology of the crystallites is retained in the absence of a liquid phase, which is contrary to the findings of prior workers in the art. The intimate mixing of highly active fine particulates in the alkoxide decomposition process is believed to be responsible for formation of the acicular morphology which is characteristic of crystalline mullite.

EXAMPLE II

A series of runs was conducted in which mullite compacts were fabricated by vacuum hot pressing. The mullite powder ($3Al_2O_3 \cdot 2SiO_2$) was prepared as described in Example I. Prior to use the as-prepared powder was calcined for 1 hour at 600°C and ground in a $B_4C$ mortar to effect comminution of any agglomerates. Specimens, ¾ to 2½ inches in diameter, were prepared by vacuum hot pressing the very fine mullite powder in graphite dies with Ta, Mo, or graphfoil liners.

Completely white specimens with densities 99 to 99.5% of theoretical (3.18 to 3.19 g/cm$^3$) were obtained by carrying out the runs under a vacuum of $1 \times 10^{-3}$ mm of Hg, at a pressure of 5 kpsi and at a temperature of 1400° to 1600°C for 15 to 60 minutes. Electron microprobe analysis of the specimens indicated a homogeneous dispersion of $SiO_2$ in the $Al_2O_3$ matrix.

Specimen A, vacuum pressed at 5 kpsi and 1500°C for 15 minutes, and specimen B, vacuum pressed at 5 ksi and 1500°C for 30 minutes, were examined by X-ray diffraction and electron microprobe. The examinations indicated only mullite present in the structures. Microhardness values did not vary across the specimens, supporting the X-ray and microprobe evidence that a second phase is not present in the structures. The electron micrographs show interlocking needle-like, acicular, and polygonal grains arranged in a mosaic-type, fine-grained microstructure. Such grain size and structure cannot be obtained in mullite prepared by other methods without treatments at about 1800°C and firing times greater than 8 hours.

Debye-Scherrer X-ray diffraction data were obtained for specimens vacuum hot pressed at 1400° and 1500°C for 15 and 30 minutes. These data were used to compute the lattice parameters and theoretical density of the mullite. The results of the computations are listed below in Table II.

TABLE II

| Hot-pressing conditions | $a_0(A)$ | $b_0(A)$ | $c_0(A)$ | $V(A^3)$ | Density (g/cm$^3$) |
| --- | --- | --- | --- | --- | --- |
| 1400°C, 5 kpsi, 30 min. | 7.528±0.0042 | 7.685±0.0043 | 2.879±0.0016 | 166.56 | 3.18 |
| 1500°C, 5 kpsi, 15 min. | 7.525±0.0021 | 7.680±0.0022 | 2.878±0.0008 | 166.32 | 3.19 |
| 1500°C, 5 kpsi, 30 min. | 7.530±0.0016 | 7.681±0.0016 | 2.876±0.0006 | 166.34 | 3.19 |

It is noted that the unit-cell volume of the specimen fired at 1400°C for 30 minutes is larger than that of the specimens with the same composition fired at 1500°C for 15 and 30 minutes. This behavior can be attributed to an amorphous phase and disorder still present in the microstructure at the lower firing temperature. For optimum results, it is preferred to vacuum hot press at 1500°C for 30 minutes.

To test the thermal shock resistance of the compacts, cubic samples (0.25 in$^3$) from specimen B were thermally shocked from 1200°C to room temperature. Thus, the cubic samples were placed in a muffle furnace maintained at 1200°C for 15 minute intervals and quenched repeatedly in cold water. The structure of the samples suffered no deleterious effects.

Certain physical properties of the high purity, high density mullite bodies were determined. The Young's modulus of mullite with a bulk density of 3.15 to 3.16 g/cm$^2$, measured by sphereresonance techniques, was $32.0 \times 10^6$ psi. Poisson's ratio was 0.266, with calculated shear and bulk moduli of $12.6 \times 10^6$ and $22.8 \times 10^6$ psi, respectively. The measured room temperature flexural strength determined in 4-point bending was $39 \times 10^3$ psi with compression strength exceeding $35 \times 10^4$ psi. The melting point of the mullite compacts was consistently 1880±5%C. The 100g Knopp hardness was uniformly 1750 across the mullite specimens. Thin sections of the mullite bodies were translucent to incident light.

EXAMPLE III

Mullite compacts were fabricated from the as-prepared mullite powder of Example I, i.e., from powder which had not been calcined. The compacts were prepared by reactive hot pressing in graphite molds at 1450°C and 5 kpsi with a heating rate of 8°C per minute and no holding time. The compacts were as dense as the compacts of Example II and exhibited more uniform and smaller grain size. However, a reactive hot pressed sample when thermally shocked by the procedure described in Example II fractured catastrophically after two consecutive tests.

From the foregoing it is seen that by vacuum hot pressing calcined mullite powder with acicular, needle-like morphology highly dense, translucent, polycrystalline compacts of stoichiometric mullite can be fabricated. The compacts have a fine-grained microstructure consisting of needle-like interlocking grains arranged in an overall mosaic pattern. The compacts have a high strength and excellent thermal shock resistance, properties that can be attributed to their unique microstructure.

As will be evident to those skilled in the art, various modifications of this invention can be made or followed in view of the foregoing disclosure without departing from the spirit and scope of the invention.

We claim:

1. A process for preparing mullite which comprises the steps of:
   a. adding a mixture of aluminum tris isopropoxide and a silicon alkoxide in a mol ratio of 3 to 1 to an alcohol, the silicon alkoxide being selected from the group consisting of those having the formula $Si(OR)_4$, where R is methyl, ethyl, isopropyl or n-butyl and the alcohol being selected from the group consisting of those having the formula ROH, the alcohol selected having the same R group as the selected silicon alkoxide;
   b. refluxing the resulting solution for from about 8 to 24 hours;
   c. adding the solution to a dilute solution of a weak base or mineral acid, thereby forming hydroxyaluminosilicate, the solution of the weak base containing from about 0.25 to 5 milliliters of a saturated solution of the weak base per mol of water and the solution of the mineral acid containing about 2 to 5 drops of acid per mol of water;
   d. washing the hydroxyaluminosilicate with isopropyl alcohol; and
   e. drying the washed hydroxyaluminosilicate under a vacuum, thereby converting it to mullite.

2. The process according to claim 1 in which the solution of the mixture of aluminum tris isopropoxide and silicon alkoxide in the alcohol is added to a dilute solution of ammonium hydroxide.

3. The process according to claim 2 in which the silicon alkoxide is silicon tetrakis methoxide and the alcohol is methyl alcohol.

4. The process according to claim 2 in which the silicon alkoxide is silicon tetrakis ethoxide and the alcohol is ethyl alcohol.

5. The process according to claim 2 in which the silicon alkoxide is silicon tetrakis isopropoxide and the alcohol is isopropyl alcohol.

6. The process according to claim 1 in which the solution of the mixture of aluminum tris isopropoxide and silicon alkoxide in the alcohol is added to a dilute solution of nitric acid.

7. The process according to claim 6 in which the silicon alkoxide is silicon tetrakis isopropoxide and the alcohol is isopropyl alcohol.

8. The process according to claim 6 in which the silicon alkoxide is silicon tetrakis butoxide and the alcohol is n-butyl alcohol.

9. The process according to claim 1 in which the hydroxyaluminosilicate is dried by heating same under a vacuum at a temperature ranging from about 55° to 65°C for a period of time sufficient to distill off any isopropyl alcohol and water that is formed.

10. The process according to claim 1 in which the mullite is calcined at a temperature in the range of about 500° to 700°C for a period of about 1 to 24 hours, thereby providing acicular particulates having an orthorhombic crystalline structure.

11. The process according to claim 10 in which the calcined mullite particulates are compressed under a vacuum for a period of about 15 to 60 minutes under a pressure of about 3 to 5 thousand pounds per square inch and at a temperature of about 1300° to 1600°C, thereby producing a highly dense, translucent, polycrystalline body of mullite.

12. The process according to claim 11 in which the vacuum ranges from about $5\times10^{-4}$ to $5\times10^{-3}$ mm of Hg.

* * * * *